(12) United States Patent
Lichota

(10) Patent No.: US 9,731,828 B2
(45) Date of Patent: Aug. 15, 2017

(54) AIRCRAFT SEAT, WITH CRUMPLE ZONES

(71) Applicant: FUSIONCOPTER Sp. z o.o., Warsaw (PL)

(72) Inventor: Jacek Lichota, Warsaw (PL)

(73) Assignee: FUSIONCOPTER, Sp. z o.o, Warsaw (PL)

( * ) Notice: Subject to any disclaimer, the term of this patent is extended or adjusted under 35 U.S.C. 154(b) by 220 days.

(21) Appl. No.: 14/586,211

(22) Filed: Dec. 30, 2014

(65) Prior Publication Data

US 2016/0122023 A1 May 5, 2016

(30) Foreign Application Priority Data

Nov. 4, 2014 (EP) .................................... 14460081

(51) Int. Cl.
*B64D 11/06* (2006.01)
*B60N 2/427* (2006.01)

(52) U.S. Cl.
CPC ...... *B64D 11/0619* (2014.12); *B60N 2/42709* (2013.01); *B64D 11/0689* (2013.01); *Y02T 50/46* (2013.01)

(58) Field of Classification Search
CPC ............ B64D 11/0619; B64D 2/42709; B64D 11/0689; B60N 2/42709
See application file for complete search history.

(56) References Cited

U.S. PATENT DOCUMENTS

| | | | | |
|---|---|---|---|---|
| 4,350,390 A | * | 9/1982 | Ogawa .................... | A47C 5/00 297/452.18 |
| 5,462,339 A | * | 10/1995 | Schmale .............. | B60N 2/4263 297/452.15 |
| 5,485,976 A | * | 1/1996 | Creed .................... | B64D 11/06 244/118.6 |
| 5,662,376 A | * | 9/1997 | Breuer ................. | B60N 2/4242 296/68.1 |
| 5,967,604 A | * | 10/1999 | Yoshida ............... | B60N 2/4221 248/429 |

(Continued)

OTHER PUBLICATIONS

14 CFR 27.562 downloaded on Dec. 30, 2014 from http://www.gpo.gov/fdsys/pkg/CFR-2011-title14-vol1/pdf/CFR-2011-title14-vol1-sec27-562.pdf.

(Continued)

*Primary Examiner* — David R Dunn
*Assistant Examiner* — Tania Abraham
(74) *Attorney, Agent, or Firm* — Myers Wolin, LLC

(57) ABSTRACT

An aircraft seat comprises a sitting part, sides and a backrest, having structural components which undergo controlled deformation under the influence of an overload. The sitting part is provided with a backward inclined upper panel and a lower panel provided with at least one absorber forming the crumple zone. The upper panel is made of a framed rack permanently connected to the sides and to the backrest, while the sitting part, placed inside the rack above the absorber, is attached to the front and rear portions of the rack with a non-releasable connection of reduced tensile strength wherein the front raised part of the rack is provided with a transverse reinforcement forming the support of a thigh portion of legs, and each side is supported on two resilient rings in the shape of a split ring having a specified compressive strength, forming an additional crumple zone.

7 Claims, 6 Drawing Sheets

(56) References Cited

U.S. PATENT DOCUMENTS

| | | | | |
|---|---|---|---|---|
| 6,010,195 A | * | 1/2000 | Masters | B60N 2/0232 297/284.11 |
| 6,896,324 B1 | | 5/2005 | Kull et al. | |
| 7,354,106 B2 | * | 4/2008 | Dennis | B60N 2/4242 297/216.1 |
| 8,540,313 B2 | * | 9/2013 | Fujita | B60N 2/028 297/296 |
| 8,550,564 B1 | * | 10/2013 | Kismarton | B64D 11/06 297/216.1 |
| 8,573,690 B2 | * | 11/2013 | Shoji | B60N 2/4242 297/216.1 |
| 8,616,637 B2 | * | 12/2013 | Trimble | B64D 11/0696 297/216.15 |
| 2008/0231092 A1 | * | 9/2008 | Silva | B64D 11/06 297/216.13 |
| 2011/0233975 A1 | * | 9/2011 | Mindel | B60N 2/24 297/216.17 |
| 2012/0318920 A1 | * | 12/2012 | Rojas Gallego | B60N 2/4242 244/122 R |
| 2013/0229038 A1 | | 9/2013 | Marshall | |

OTHER PUBLICATIONS

14 CFR 29.562 downloaded on Dec. 30, 2014 from http://www.gpo.gov/fdsys/pkg/CFR-2002-title14-vol1/pdf/CFR-2002-title14-vol1-sec29-562.pdf.
14 CFR 25.562 downloaded on Dec. 30, 2014 from http://www.gpo.gov/fdsys/pkg/CFR-2011-title14-vol1/pdf/CFR-2011-title14-vol1-sec25-562.pdf.
14 CFR 23.562 downloaded on Dec. 30, 2014 from http://www.gpo.gov/fdsys/pkg/CFR-2012-title14-vol1/pdf/CFR-2012-title14-vol1-sec23-562.pdf.

\* cited by examiner

007
AIRCRAFT SEAT, WITH CRUMPLE ZONES

CROSS REFERENCE TO RELATED APPLICATIONS

This application claims priority under 35 U.S.C. §119 to European Patent Application No. EP 14460081, filed on Nov. 4, 2014, the contents of which are hereby incorporated by reference herein.

FIELD OF THE INVENTION

The invention relates to an aircraft seat designed for rotorcrafts and airplanes of normal, utility, acrobatic, and local transport category.

BACKGROUND

In case of an airplane or helicopter emergency landing a rapid increase of vertical accelerations acting to the human is occurred, which could lead to serious damage of a spine. In order to counteract this danger aircraft seats are equipped with different types of shock-absorbing systems and crumple zones increasing crash safety by absorbing energy acting on a pilot. In lightweight flying designs the aim is to seek such solutions that increase the safety level while maintaining a minimum weight and dimensions of the seat.

Patent Application US 2013229038 describes the construction of a seat, wherein the sitting part made of a metal sheet has side portions which are double bent in such a manner that in the result of the exerted force it develops absorbing a part of the energy. The side portions may be further joined by rivets fixing the bent part during normal use. When the assumed force is exceeded the rivets fall out and the bent portion is straightened and absorbs a part of the force acting on the pilot pelvis and lowers the position of the sitting part by a few centimeters.

From U.S. Pat. No. 6,896,324 an aircraft seat is known having an ergonomically formed sitting part coupled to the sides and to the backrest provided with structural elements which undergo the controlled plastic deformation under influence of an overload. The upper panel of the sitting part can be downwardly deformed and absorbs a part of the energy induced by a vertical acceleration. Under the upper panel of the seat an absorber is arranged forming a crumple zone, which, after deformation of the upper panel, absorbs a part of the crash energy. The absorber is supported by a lower panel of the seat attached to the sides. The absorber may be made of aluminium in the form similar to a honeycomb or from other energy absorbing materials, such as plastic foam materials. A part of the energy can also be absorbed by the properly made seat sides to which the sitting part is attached.

The object of the invention is to provide a lightweight seat structure characterized by an increased safety level.

SUMMARY

The aircraft seat with the sitting part, sides and backrest having structural components which undergo the controlled deformation under the influence of an overload, the sitting part of which is provided with a backward inclined upper panel and a lower panel provided with at least one absorber forming the crumple zone, is characterized according to the invention in that the upper panel is made of a framed rack permanently connected to the sides and to the backrest, while the seating part, placed inside the rack above the absorber, is attached to the front and rear portions of the rack by means of a non-releasable connection of reduced tensile strength, particularly with the riveted joint, wherein the front raised part of the rack is provided with a transverse reinforcement forming the support of a thigh portion of legs, and each side is supported on two resilient rings in the shape of a split ring having a specified compressive strength, forming an additional crumple zone.

It is advantageous if the resilient rings have three mounting holes, wherein the two of them are arranged at the ends of the split ring and the third mounting hole is arranged on the opposite side of the slit.

It is advantageous if the side portions of the rack and the backrest are obliquely bent out on both sides of the seat and connected to each other with the corners.

It is advantageous if the transverse reinforcement comprises a shaped profile attached by means of rivets to the front part of the rack and an additional protective profile forming the front edge of the transverse reinforcement.

It is advantageous if the sitting portion is attached to the rear part of the rack with pop rivets of lower tensile strength in relation to the non-releasable connection to the front part of the rack.

In a preferred embodiment of the seat, its sides are connected to the resilient rings by means of an adjustable mounting mechanism of the seat consisting of rails, hinged levers and pins for locating of the fixed seat, wherein each of the resilient rings is releasably fastened to the rails, and further each resilient ring is fastened to the rails by means of two mounting holes located at the ends of the split ring.

Aircraft seat according to the invention has a light structure that meets the dynamic conditions after emergency landing specified in the certification provisions in a range of parameters to be met by devices used to sit in the small and large rotorcrafts and also in airplanes. The resilient rings function as shock absorbers until their strength is exceeded. The design of the split resilient rings having three-point mounting allows their proper operation in a wide range of the seat deformations, even when the floor is deformed. After the collapse of the rings under the influence of the vertical acceleration acting on the human body the upper panel is deformed until the rivets connecting the seat part to the rack are broken. The absorber located in the crumple zone between the upper panel and the lower panel takes over further energy absorption. Correspondingly shaped side parts of the rack and the backrest on both sides of the seat can be used as guides of the human body to control the direction of its movement in accordance with a predetermined trajectory.

The solution according to the present invention influences on increasing of the degree of energy absorption by the elements of the seat structure and on elongation of the trajectory of a human pelvis along the direction of the vertical acceleration.

BRIEF DESCRIPTION OF THE DRAWINGS

The object of the invention is illustrated in the embodiment in the accompanying drawing, in which.

DETAILED DESCRIPTION OF THE PREFERRED EMBODIMENTS

Figure 1A:
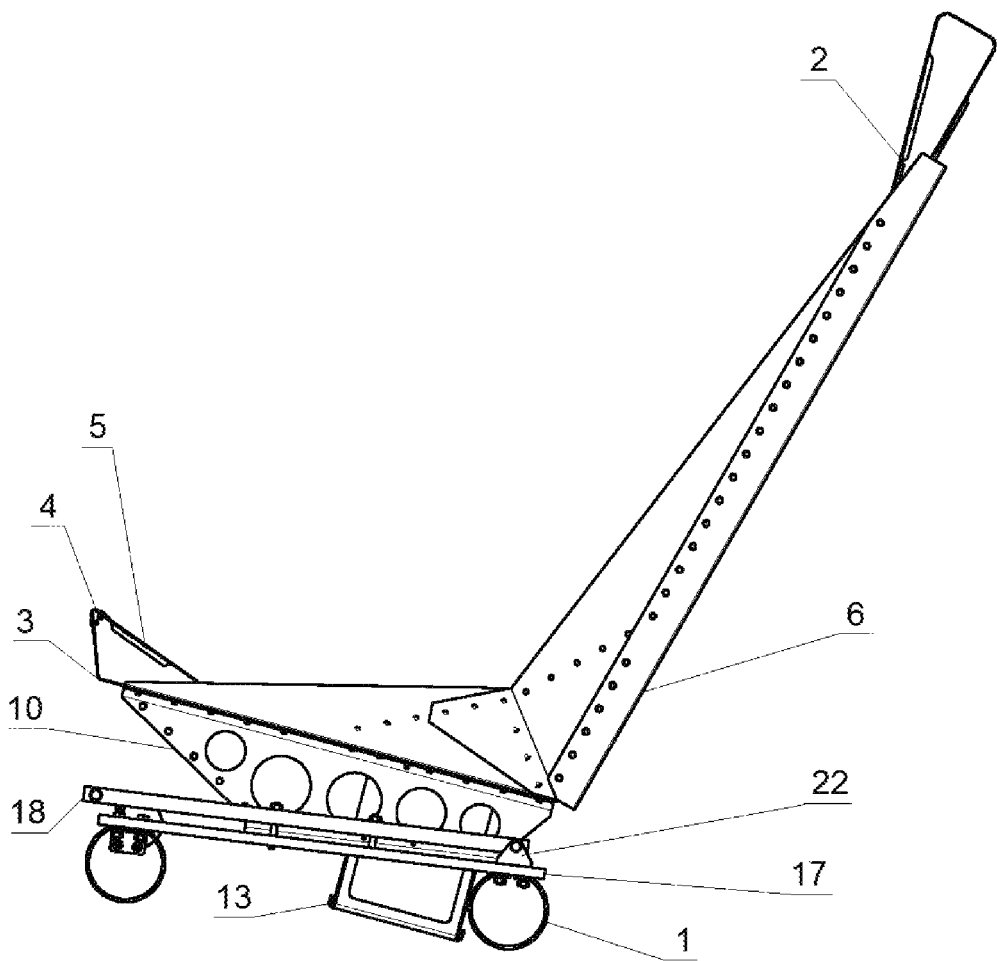
FIG. 1A shows the aircraft seat in a side view.
Figure 1B:
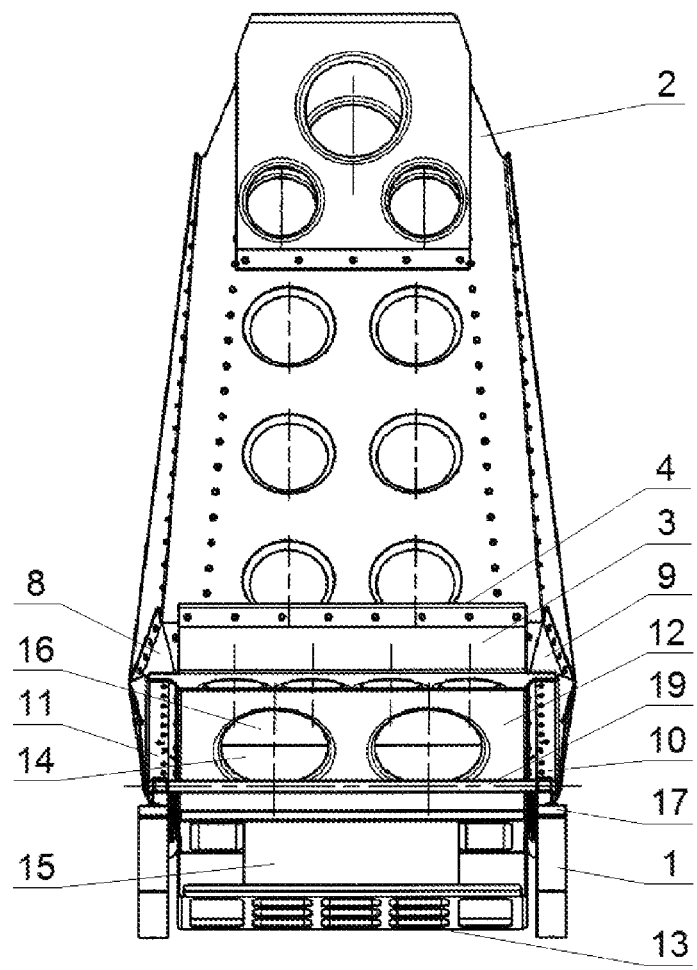
FIG. 1B shows the aircraft seat in a front view.
Figure 1C:
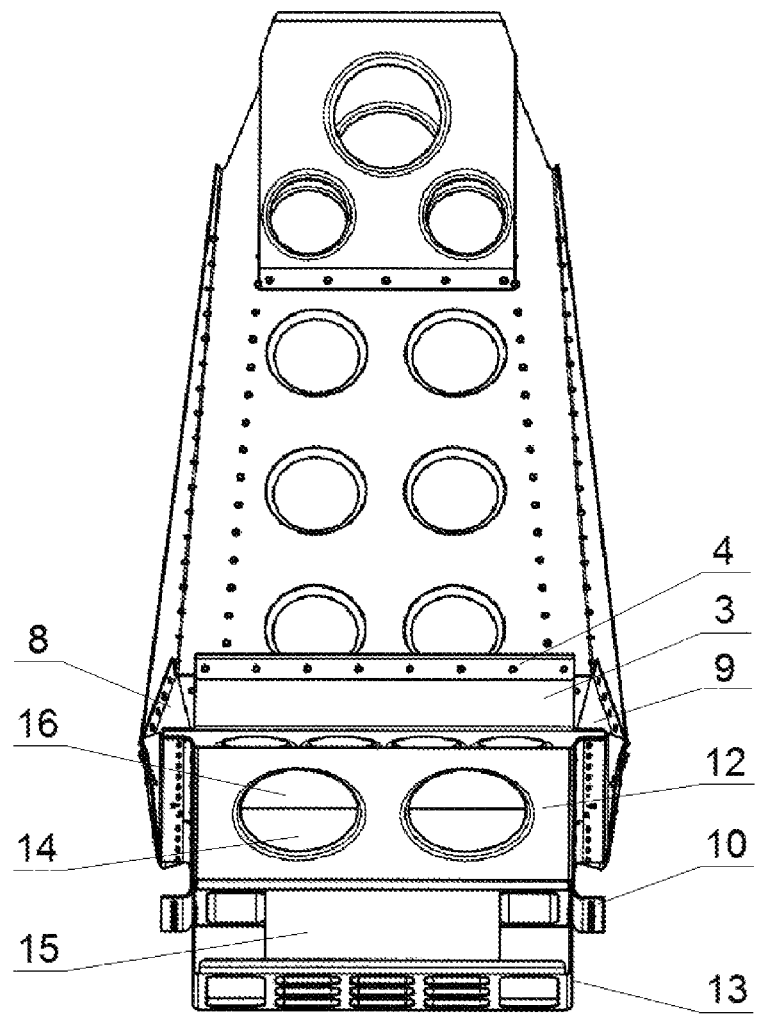
FIG. 1C shows the aircraft seat without the fixing mechanism in a front view
Figure 2:
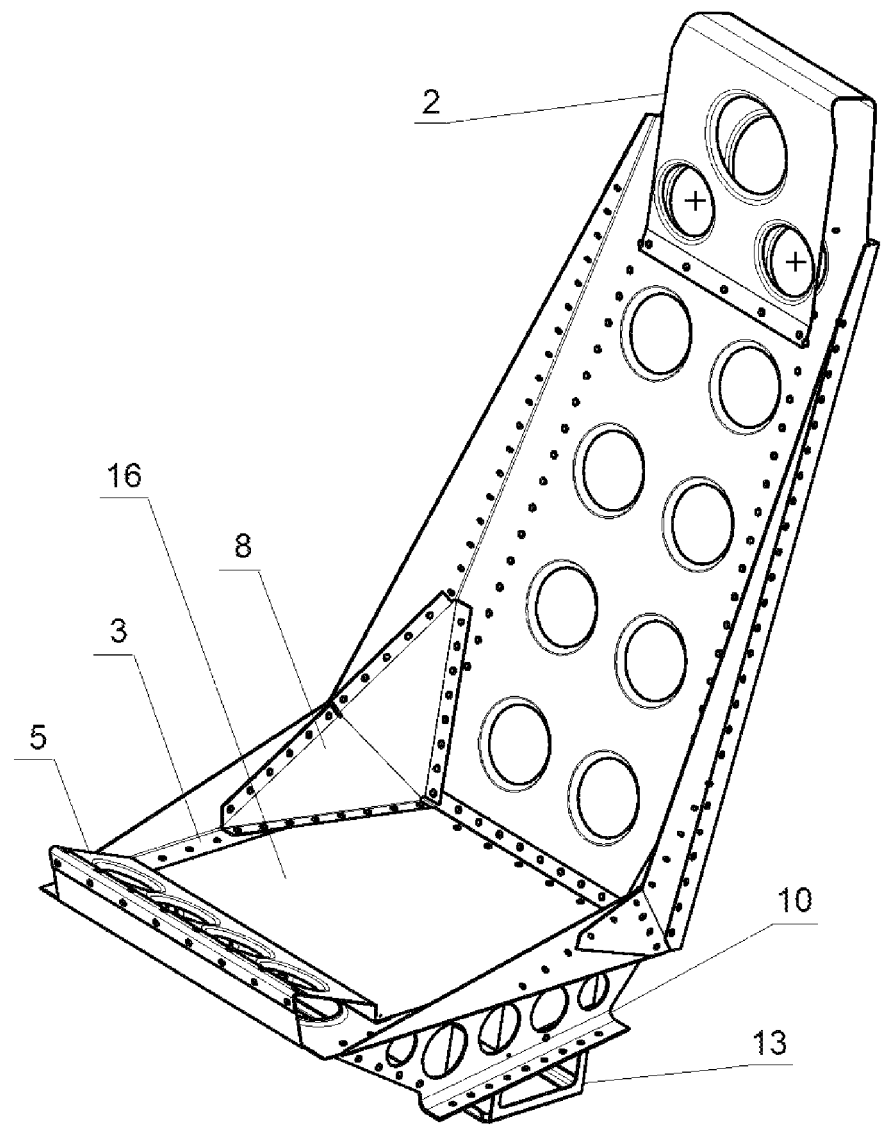
FIG. 2 shows in a perspective view the construction of the seat.
Figure 3:
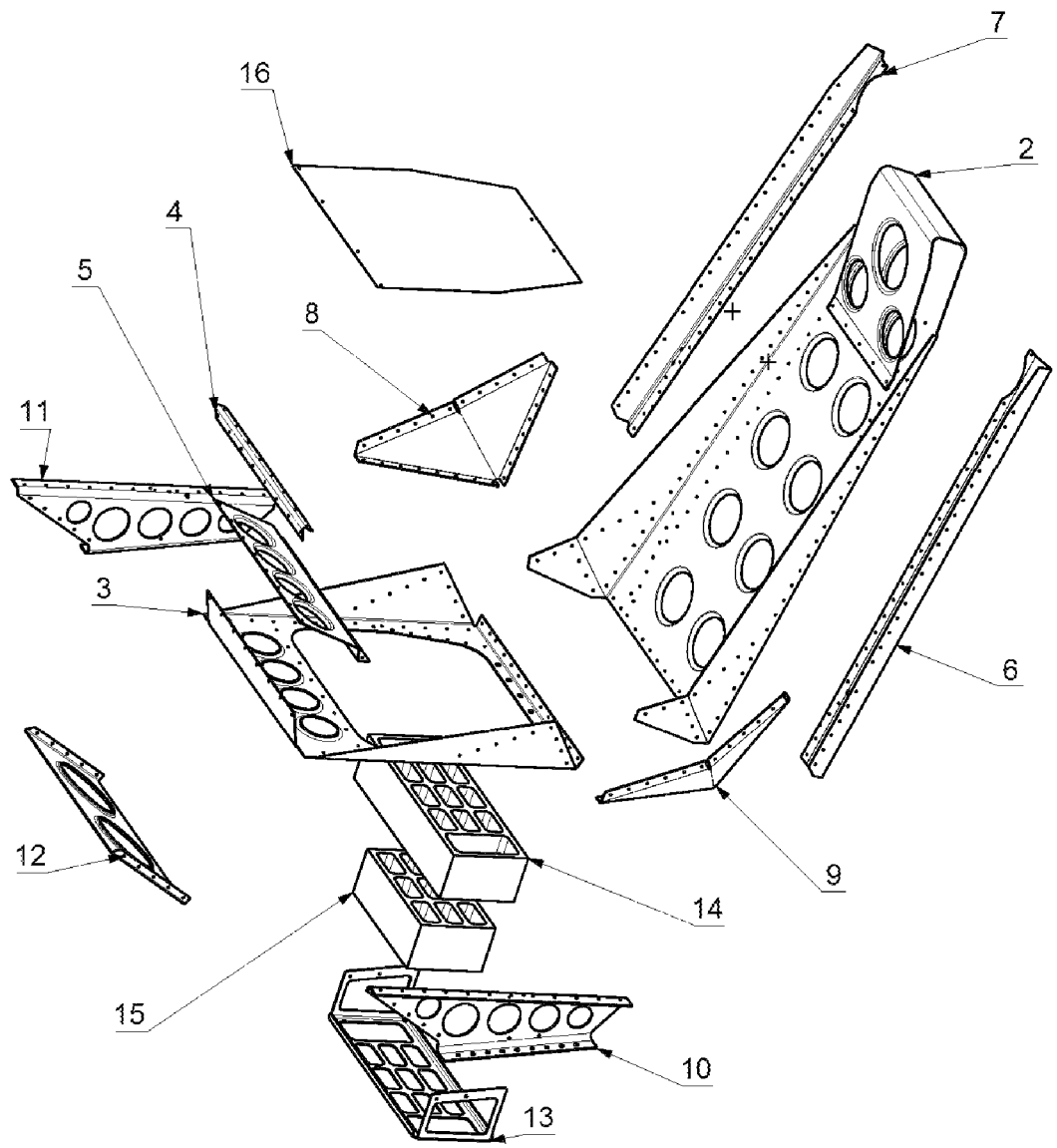
FIG. 3 shows parts of the seat structure in the mounting arrangement.

As illustrated in FIGS. 1A-3, the structure of the aircraft seat comprises the sitting part, the sides 10, 11 and the rearward slanted backrest 2, made of aluminium metal sheet or composite material and permanently joined by riveting. The seat structure includes components which undergo controlled deformation under influence of an overload. The sitting part is provided with the backward inclined upper panel and the lower panel 13 provided with at least one absorber 14 forming the crumple zone. The lower panel 13 is rigidly attached to the sides 10, 11. Additional stiffening is provided through the front panel 12 attached to the sides 10, 11 at the front of the seat in front of the absorber 14. The absorber 14 may be made of aluminium in the form similar to a honeycomb or from other energy absorbing materials, such as plastic foam materials. In order to obtain suitable crushing parameters, the crumple zone may be provided with an additional layer of an energy absorbent material or with an additional absorber 15 shown in FIG. 3. Suitable perforation of the energy-absorbing material is aimed to obtain the relevant crushing parameters. The upper panel is made of a framed rack 3 permanently connected to the sides 10, 11 and to the backrest 2, while the sitting portion 16, placed inside the rack 3 above the absorber 14, is attached to the front and rear parts of the rack 3 with a non-releasable connection of a reduced tensile strength, in the form of the riveted joint. The riveted joint of the sitting portion 16 to the rear part of the rack 3 shown in FIG. 2 may be performed with pop rivets of lower tensile strength in relation to the non-releasable connection to the front part of the backward inclined rack 3, which is raised higher than the rear part. The raised front part of the rack 3 is provided with the transverse reinforcement forming the support of a thigh portion of legs. The transverse reinforcement comprises the shaped profile 5 attached by means of rivets to the front part of the rack 3 and the additional protective profile 4 forming the front edge of the transverse reinforcement. The side parts of the rack 3 and the backrest 2 are obliquely bent out on both sides of the seat and connected to each other with the corners 8, 9. Additional reinforcement provides side profiles 6, 7 riveted on both sides to the back and side parts of the backrest 2. The sitting portion 16 is attached to the rear part of the rack 3 by means of rivets having a lower tensile strength than the riveted joints to the front part of the rack 3. Each side 10, 11 is supported on two resilient rings 1 in the shape of a split ring having a specified compressive strength, forming the additional crumple zone. The resilient rings 1 have two mounting holes arranged at the ends of the split ring and one mounting hole arranged on the opposite side of the slit. The resilient rings 1 may be attached directly to the base of the sides of the seat or through the adjustable seat mounting mechanism seen in the FIG. 4. The sides 10, 11 are connected to the resilient rings 1 by means of an adjustable mounting mechanism of the seat consisting of the rails 17, the hinged levers 18 and the pins 20, 21 for locating the position of the fixed seat, wherein each of the resilient rings 1 is releasably fastened to the rails 17, so that the slit is located at the top or bottom part of the ring. In an exemplary embodiment of the seat, the resilient ring 1 is fixed in two points to the rails 17 by means of the mounting holes located at the slit of the ring, and the third mounting hole is used for its single point connection to the floor. The slit in the resilient ring 1 allows its torsional deformation under influence of the load until the edges of the ring will contact each other in the slit zone.

Figure 4:
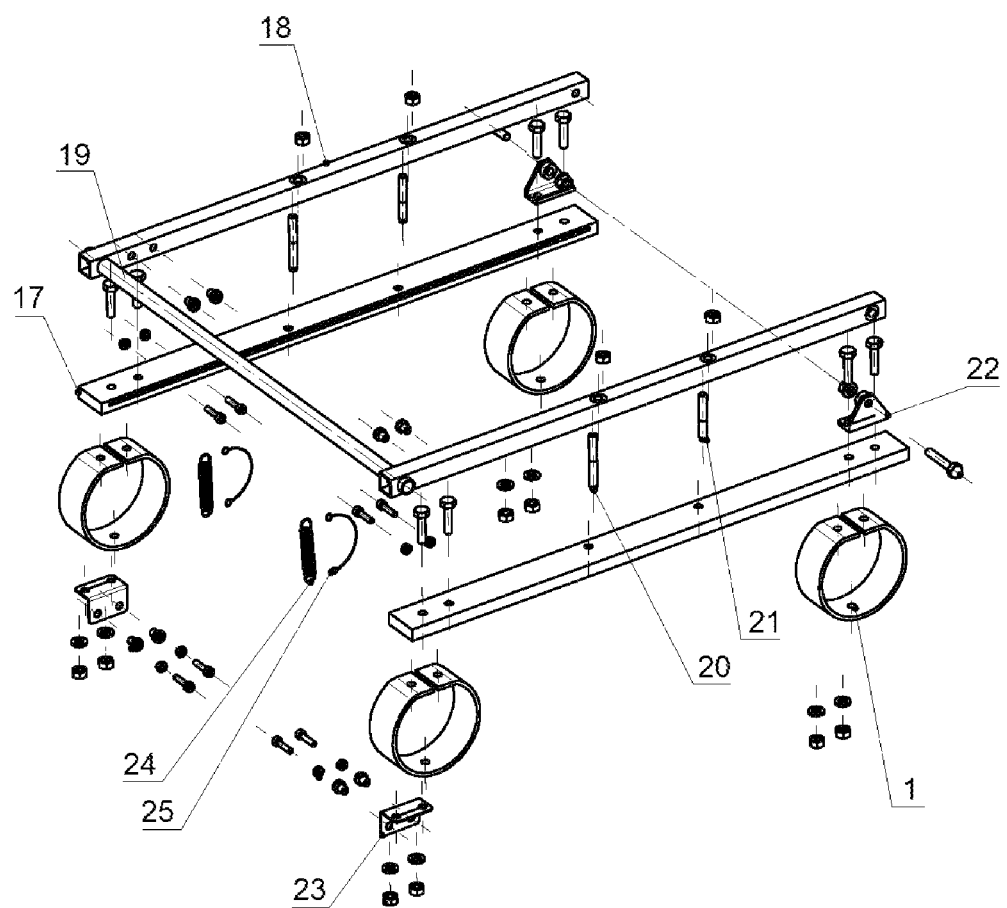
FIG. 4 shows the fixing mechanism of the aircraft seat in a mounting configuration.

As illustrated in FIG. 4, the adjustable mounting mechanism of the seat comprises the rails 17, the hinged levers 18 and the pins 20, 21 for locating the position of the fixed seat. The front pin 20 is longer than the rear pin 21. The free ends of the lever 18 are rigidly connected by the rod 19. Each of the resilient rings 1 is secured to the rails 17 in two points. In addition, the bracket 22 of the lever 18 is attached to each rail 17. After mounting of the bases of the sides 10, 11 in the rails 17, the position of the seat is located with the releasably attached pins 20, 21. The brackets 23 of the springs 24 and the retaining cables 25 are attached to the front part of the rails 17 by bolts to allow changing the position of the seat when the lever 17 is displaced up and the pins 20, 21 are removed.

The use of the sitting part with the properly fitted sitting portion 16 made of metal sheet or composite increases comfort of using the seat, which behaves like an ordinary stiff seat until the load chosen by the constructor is achieved. During normal use the sitting portion 16 is not broken and the contact with the absorber 14 which is susceptible to damage is not achieved. The aircraft seat mounted on the resilient rings 1 works resiliently as on shock absorbers until the strength of rings is exceeded. When the load assumed by the constructor is exceeded, the rings break down and allow the activation of the absorber 14 forming a crumple zone in the sitting part. The use of the resilient rings 1 in the shape of the split rings and fastened on one side at two points, and on the other side at one point, allows proper operation of the seat even when the floor is deformed. The obliquely bent out side parts of the rack 3 and the backrest 2 form, together with the back of the backrest 2 three guiding planes for the pilot/passenger body during hitting the ground. After hitting the ground the sheet of the sitting portion 16 is loaded by the person sitting in the seat with a force that causes breaking the non-releasable connection of reduced tensile strength from the side of the seat backrest. At the same time the resilient rings 1 lose stability and break down. The pilot/passenger body falls in the hole in the rack 3 and hits the absorber 14, which due to its destruction delays the movement of the man. The braking distance of the body in a direction coinciding with the axis of the spine is also lengthened. This reduces the compression load to which the pilot / passenger spine is subjected to in the region of the pelvis, to the values specified in the technical specifications determined in the provisions of CS 27.562 or CS 23.562 point c7 for small rotorcrafts, and in analogous conditions determined in the provisions of CS 29.562 for large rotorcrafts and CS 25.562 for airplanes. According to these conditions, the maximum compressive load measured between the pelvis and the lumbar spine of the ATD manikin cannot exceed 6674 N (1500 lbs). The design of the seat makes that during the collision with the earth at an angle of 60 degrees, the human trunk is guided along the backrest 2 in the direction of the crumple zone, and after breaking the sitting portion 16 it sinks into the seat and goes between the rigid vertical sides 10, 11, while the knees are supported on the transverse reinforcements. At the known assumed trajectory of the human movement it is possible to precise determine the location of the crumple zone in the sitting part and choose the appropriate parameters of the crash. This allows increasing the safety level of the pilot/passenger during an emergency landing. In addition, having known the crushing parameters the more precise determination of the optimal amount of energy-absorbing material is possible, which reduces the weight of an aircraft seat.

The invention claimed is:

1. An aircraft seat comprising:
   a sitting part, sides and a backrest, and
   having structural components which undergo controlled deformation under the influence of an overload,
   the sitting part of which is provided with a backward inclined upper panel and a lower panel provided with at least one absorber forming a crumple zone,
   wherein the upper panel is made of a framed rack (3) permanently connected to the sides (10, 11) and to the backrest (2), and
   a sitting portion (16) is placed inside the rack (3) above the absorber (14),
   wherein the sitting portion is attached to front and rear parts of the rack (3) with a non-releasable connection of reduced tensile strength, particularly a riveted joint, the sitting portion is attached to the rear part of the rack with pop rivets of lower tensile strength in relation to the non-releasable connection to the front part of the rack,
   wherein a front raised part of the rack (3) is provided with a transverse reinforcement forming the support of a thigh portion of legs, and each side (10, 11) is supported on two resilient rings (1) in the shape of a split ring having a specified compressive strength, forming an additional crumple zone.

2. The seat of claim 1, wherein the resilient rings (1) have three mounting holes, wherein two of the mounting holes are arranged at the ends of the split ring and the third mounting hole is arranged on the opposite side of a slit in the split ring.

3. The seat of claim 1, wherein side parts of the rack (3) and the backrest (2) are obliquely bent out on both sides of the seat and connected to each other with corners (8, 9).

4. The seat of claim 1, wherein the transverse reinforcement comprises a shaped profile (5) attached by means of rivets to the front part of the rack (3) and an additional protective profile (4) forming the front edge of the transverse reinforcement.

5. The seat of claim 1, wherein the sides (10, 11) are connected to the resilient rings (1) by means of an adjustable mounting mechanism of the seat consisting of rails (17), hinged levers (18) and pins (20, 21) for locating the position of the fixed seat, wherein each of the resilient rings (1) is releasably fastened to the rails (17).

6. The seat of claim 5, wherein each resilient ring (1) is secured to the rails (17) with two mounting holes arranged on the ends of the split ring.

7. An aircraft seat comprising:
   a sitting part, sides and a backrest, and
   having structural components which undergo controlled deformation under the influence of an overload,
   the sitting part of which is provided with a backward inclined upper panel and a lower panel provided with at least one absorber forming a crumple zone,
   wherein the upper panel is made of a framed rack (3) permanently connected to the sides (10, 11) and to the backrest (2), and
   a sitting portion (16) is placed inside the rack (3) above the absorber (14),
   wherein the sitting portion is attached to front and rear parts of the rack (3) with a non-releasable connection of reduced tensile strength, particularly a riveted joint,
   wherein a front raised part of the rack (3) is provided with a transverse reinforcement forming the support of a thigh portion of legs, and each side (10, 11) is supported on two resilient rings (1) in the shape of a split ring having a specified compressive strength, forming an additional crumple zone, and
   wherein the resilient rings have three mounting holes, wherein two of the mounting holes are arranged at the ends of the split ring and the third mounting hole is arranged on the opposite side of a slit of the split ring.

* * * * *